US012686591B2

(12) United States Patent
Villa

(10) Patent No.: US 12,686,591 B2
(45) Date of Patent: Jul. 21, 2026

(54) INTERFACE FOR OPERATING AN ELEVATOR CAR, ELEVATOR CAR AND METHOD OF PRODUCING AN ELEVATOR CAR

(71) Applicant: Inventio AG, Hergiswil (CH)

(72) Inventor: Valerio Villa, Colverde (IT)

(73) Assignee: INVENTIO AG, Hergiswil (CH)

( * ) Notice: Subject to any disclaimer, the term of this patent is extended or adjusted under 35 U.S.C. 154(b) by 945 days.

(21) Appl. No.: 17/996,080

(22) PCT Filed: Apr. 16, 2021

(86) PCT No.: PCT/EP2021/059935
§ 371 (c)(1),
(2) Date: Oct. 13, 2022

(87) PCT Pub. No.: WO2021/213921
PCT Pub. Date: Oct. 28, 2021

(65) Prior Publication Data
US 2023/0137132 A1 May 4, 2023

(30) Foreign Application Priority Data
Apr. 20, 2020 (EP) ..................................... 20170358

(51) Int. Cl.
*B66B 1/46* (2006.01)
*B66B 1/50* (2006.01)
(Continued)

(52) U.S. Cl.
CPC .............. *B66B 1/463* (2013.01); *B66B 1/467* (2013.01); *B66B 1/50* (2013.01); *B66B 11/0226* (2013.01);
(Continued)

(58) Field of Classification Search
CPC ........... B66B 1/463; B66B 1/467; B66B 1/50; G06F 3/16; G06F 3/04144; G06F 3/04164
See application file for complete search history.

(56) References Cited

U.S. PATENT DOCUMENTS 5,485,897 A * 1/1996 Matsumoto ............. B66B 3/008
187/397
5,587,567 A * 12/1996 Winter .................... B66B 1/462
200/600
(Continued)

FOREIGN PATENT DOCUMENTS

CN 1680182 A 10/2005
CN 101427468 A 5/2009
(Continued)

*Primary Examiner* — Rina I Duda
(74) *Attorney, Agent, or Firm* — Shumaker, Loop & Kendrick, LLP

(57) ABSTRACT
An interface for operating an elevator car includes an interface controller, a foil attached to a wall surface of a wall of the elevator car, the wall surface facing an inside of the elevator car, and at least one pressure-sensitive sensor configured for receiving user requests by an application of a pressure to the at least one sensor. The at least one sensor is connected to the interface controller, the interface controller transmitting the user requests received by the at least one sensor to a car controller of the elevator car, and wherein the at least one sensor is embedded in the foil.

14 Claims, 3 Drawing Sheets

(51) Int. Cl.
    *B66B 11/02*           (2006.01)
    *G06F 3/01*            (2006.01)
    *G06F 3/041*          (2006.01)

(52) U.S. Cl.
    CPC .......... *G06F 3/016* (2013.01); *G06F 3/04144*
           (2019.05); *G06F 3/04164* (2019.05); *B66B*
           *2201/4623* (2013.01); *B66B 2201/463*
                     (2013.01)

(56)           References Cited

U.S. PATENT DOCUMENTS

| | | | |
|---|---|---|---|
| 6,161,654 A | 12/2000 | Sirigu et al. | |
| 7,404,471 B2 * | 7/2008 | Felder ..................... | B66B 1/463 |
| | | | 187/395 |
| 7,562,748 B2 * | 7/2009 | Stranieri ................ | B66B 1/468 |
| | | | 187/391 |
| 9,952,702 B2 * | 4/2018 | Bünter ................ | H03K 17/964 |
| 2007/0089939 A1 * | 4/2007 | Liebetrau ............ | H03K 17/964 |
| | | | 187/395 |
| 2007/0236470 A1 * | 10/2007 | Abanami ............ | G06F 3/04886 |
| | | | 345/173 |
| 2007/0257821 A1 | 11/2007 | Son et al. | |
| 2015/0009148 A1 * | 1/2015 | Bentsen .............. | G06F 3/03549 |
| | | | 345/167 |
| 2017/0160835 A1 | 6/2017 | Zenker et al. | |
| 2018/0186598 A1 * | 7/2018 | Coldre ................... | B66B 3/008 |
| 2019/0177117 A1 | 6/2019 | Lofberg et al. | |

FOREIGN PATENT DOCUMENTS

| | | | |
|---|---|---|---|
| CN | 103733167 A | 4/2014 | |
| CN | 108928720 A | 12/2018 | |
| CN | 109643201 A | 4/2019 | |
| EP | 1514829 A1 | 3/2005 | |
| KR | 20180136158 A | 12/2018 | |
| WO | 03055779 A1 | 7/2003 | |
| WO | 2015124826 A1 | 8/2015 | |
| WO | 2018050258 A1 | 3/2018 | |
| WO | 2019003391 A1 | 1/2019 | |

* cited by examiner

100

120

150

152

130

130

110 INTERFACE CONTROLLER

140

130 SENSOR

130

150　120

140

130

130 SENSOR

152

110 INTERFACE CONTROLLER
130 SENSOR
558 CAR CONTROLLER
570 PROJECTOR

610 ATTACH FOIL TO ELEVATOR CAR WALL SURFACE

620 INSTALL PROJECTOR IN ROOF SECTION OF ELEVATOR CAR

630 INSTALL INTERFACE CONTROLLER IN ROOF SECTION

640 CONNECT FOIL AND PROJECTOR TO INTERFACE CONTROLLER

INTERFACE FOR OPERATING AN ELEVATOR CAR, ELEVATOR CAR AND METHOD OF PRODUCING AN ELEVATOR CAR

FIELD

The present invention relates to an interface for operating an elevator car, to an elevator car and to a method of producing an elevator car.

BACKGROUND

Elevators are generally used for transporting persons or material from one level to another level, for example in a building. The elevator comprises an elevator car which may be moved between the various levels using a drive unit. The drive unit can be controlled by an elevator controller.

In order to enable activation of the elevator controller to drive the car to a specific level, operating panels are usually provided in the car or at the floor levels. For example, a car operating panel (COP) may be provided within the car as an interface between the elevator controller and a user of the elevator. A user of the elevator may use the car operating panel to provide a request to the elevator controller to move the elevator car to a specific floor level. A conventional car operating panel includes a panel plate and a plurality of push buttons reaching through the panel plate. Some car operating panels include a display device reaching through the panel plate, e.g. a segment display indicating floor numbers. Conventionally, the panel plate is mounted to a side wall of the elevator car or can form a portion of the side wall.

However, conventional car operating panels can have various disadvantages, in particular with respect to a space required for mounting a panel with its electrical components to a side wall of the car. Conventional car operating panels may have disadvantages with respect to the compatibility with curved side walls of an elevator car, or may have disadvantages with respect to servicing of the panel, e.g. cleaning of the panel.

SUMMARY

Accordingly, there may be a need for an interface for operating an elevator car, which is improved with respect to conventional car operating panels, particularly with respect to the required space, the compatibility with curved side walls or servicing. Furthermore, there may be a need for an elevator car including an interface according to embodiments described herein, or for a method of producing an elevator car comprising an interface. Such needs may be met with the subject matter of the advantageous embodiments defined in the following specification.

An aspect relates to an interface for operating an elevator car, comprising an interface controller, a foil for attachment to a wall surface of a wall of the elevator car, the wall surface facing an inside of the elevator car, and at least one pressure-sensitive sensor configured for receiving user requests by an application of a pressure to the at least one sensor, wherein the at least one sensor is connected to the interface controller, the interface controller being configured for transmitting the user requests received by the at least one sensor to a car controller of the elevator car, and wherein the at least one sensor is embedded in the foil.

Another aspect relates to an elevator car, comprising an interface according to embodiments described herein, and a wall having a wall surface facing an inside of the elevator car, wherein a foil of the interface is attached to the wall surface.

Yet another aspect relates to a method of producing an elevator car comprising an interface, particularly an interface according to embodiments described herein, the method comprising attaching a foil of the interface to a wall surface of a wall of the elevator car, wherein at least one pressure-sensitive sensor of the interface is embedded in the foil, and wherein the at least one sensor is configured for receiving user requests by an application of a pressure to the at least one sensor.

Embodiments of the present disclosure relate to an interface for operating an elevator car. In particular, the interface is configured for receiving user requests from a user of the elevator, e.g. from a person using the elevator to travel from one floor to another. The interface, in particular the at least one sensor of the interface, is configured for receiving a user request by an application of a pressure by the user to the at least one sensor. A pressure may be applied to a first sensor of the at least one sensor by touching or by applying a force onto a first region of the foil, wherein the first sensor is arranged in the first region of the foil. A user request can include for example a user input for selecting a destination floor, a request for closing a car door, a request for opening the car door, a request for an emergency call, or a request for ringing an emergency bell. In the present disclosure, the term "or" is to be understood particularly as "and/or".

According to embodiments, the foil is configured for attachment to a wall surface of a wall of an elevator car. In some embodiments, the wall surface can be a region of the wall reaching to at least one side of the wall, a roof section of the elevator car or a floor of the elevator car. For example, the wall surface can be an entire surface of a wall, a wall region reaching to a roof section of the elevator car of a wall, a vertical or a horizontal stripe, e.g. a vertical stripe reaching from a floor of the elevator car to a roof section of the elevator car. In particular, connections, e.g. electrical circuitry, between the foil and the interface controller may advantageously be arranged outside an interior space of the elevator car.

In embodiments, the at least one sensor is embedded in the foil. Herein, the term "embedded" can be particularly understood such that the at least one sensor is not in contact with an inside of the elevator car. In some embodiments, the at least one sensor can be entirely enclosed by the foil. In further embodiments, the at least one sensor is at least substantially surrounded by the foil. For instance, one free side of the at least one sensor, e.g. a side facing the wall surface, may not be in contact with the foil.

According to embodiments, the at least one sensor is pressure-sensitive. In particular, the at least one sensor can be configured to detect a touch or a force applied to the foil, e.g. by a finger or a hand of a user. The touch or force applied to the foil can be transmitted through the foil as a pressure applied to the at least one sensor. In some embodiments, the pressure or the change in pressure may provide a change of a capacitance of the at least one sensor. The change of the capacitance can be detected by the interface controller, e.g. to determine a user request associated with a pressure applied to the at least one sensor. In contrast to some capacitive sensors, as used e.g. in some touch screens of smartphones, an interface having at least one pressure-sensitive sensor may provide the advantage that it can be operated independently of the capacitive properties of an object touching the interface. For example, an interface with at least one pressure-sensitive sensor may also be operated with "non-capacitive" gloves.

According to some embodiments, the foil comprises a protective layer between the at least one sensor and the inside of the elevator car. In particular, the protective layer of the foil can be in contact with the inside of the elevator car. The protective layer can be particularly configured for protecting the at least one sensor, e.g. from wear or from liquids. For example, the protective layer may have a thickness of at least 0.5 mm, particularly of at least 1 mm or at least 2 mm, or of maximum 5 mm, particularly of maximum 4 mm or maximum 3 mm. The protective layer may provide the advantage that the foil of the interface can be easily and thoroughly cleaned, particularly without the danger of damaging electrical components of the at least one sensor.

According to embodiments, the foil, particularly the foil comprising the embedding layer and the protective layer, has a thickness of maximum 5 mm, particularly of maximum 3 mm or of maximum 2 mm, or of minimum 0.5 mm, particularly of minimum 1 mm. The thickness of the foil is to be understood as the dimension of the foil in a direction perpendicular to the wall surface. The foil can be configured for attachment to a wall surface in a recess of the wall. An interface comprising a foil having a small thickness may advantageously allow for a seamless integration of the interface with the wall of the elevator car. In particular, the interface may be attached to a wall such that the foil is at least substantially flush with the wall, particularly without the need for holes in a wall to fit a conventional car operating panel.

In some embodiments, the protective layer comprises at least one sign indicative of a user request. The at least one sign may include at least one of a graphical sign and a tactile sign. For example, a graphical sign may be printed into or onto the protective layer. The at least one sign may include a tactile sign. A tactile sign may be formed as at least one elevation or at least one depression in the protective layer. In embodiments, each of the at least one sign is co-localized with at least one sensor. For example, a first sign of the at least one sign, the first sign being indicative of a first user request, may be co-localized with a first sensor of the at least one sensor in a first region of the foil, wherein the first sensor is associated with the first user request.

According to embodiments of the disclosure, the at least one sensor is embedded in an embedding layer of the foil, wherein the embedding layer is arranged between the protective layer and the wall surface. In particular, the at least one sensor can be at least substantially surrounded or entirely enclosed by the embedding layer of the foil.

In some embodiments, at least one of the foil, the embedding layer and the protective layer comprises a polymer or polymeric material. In particular, the polymer can comprise a synthetic or semi-synthetic organic compound. The polymer can be a plastic material. In some embodiments, at least one of the protective layer and the embedding layer may be produced from a plastic polymer or a liquid polymer, e.g. an adhesive polymer. For instance, the embedding layer may be molded around the at least one sensor to embed the at least one sensor. In some embodiments, the molding may be performed directly on the protective layer, the protective layer particularly supporting the at least one sensor. Molding may include a hardening process of the plastic polymer or liquid polymer, e.g. based on a change of temperature or a chemical reaction. In some embodiments, the embedding layer may be formed by injection molding around the at least one sensor, wherein the at least one sensor is arranged between the protective layer and a backside layer. In further embodiments, the protective layer and the embedding layer may be molded together. In yet further embodiments, the protective layer and the embedding layer may be produced separately. For instance, the protective layer and the embedding layer may be joined by a lamination process, e.g. by joining the protective layer and the embedding layer through an adhesive or by an application of heat and pressure.

According to embodiments, at least one of the foil, the embedding layer and the protective layer is flexible. The foil can be flexible such that the foil can be bent without breaking the foil and particularly without damaging the at least one sensor. In particular, the foil may be bent to a curvature of at least 2/m, particularly of at least 5/m or of at least 10/m. A curvature can be understood as the reciprocal of a radius of an osculating circle. In some embodiments, the foil can be configured flexible for attachment to a curved wall surface. For example, the curved wall surface may have a curvature of minimum 0.1/m, particularly of minimum 0.2/m or of minimum 0.4/m, or of maximum 10/m, particularly of maximum 5/m or of maximum 2/m. In embodiments, the foil may be attached to a flat wall surface.

According to some embodiments, at least one of the foil, the embedding layer and the protective layer is at least substantially transparent. In particular, "transparent" or "at least substantially transparent" may be understood such that at least 50% of an intensity of visible light is transmitted, particularly at least 70% or at least 80%. A transparent foil may advantageously enable the use of the interface with a wall made of glass without obstructing a view through the wall, or the use of the interface with a decorated wall without obstructing a view of the decoration.

According to embodiments, the interface comprises electric circuitry connecting the at least one sensor and the interface controller. In some embodiments the electric circuitry is at least partially embedded in the embedding layer of the foil. The electric circuitry may exit the foil at an edge of the foil, in particular at a top side of the foil. The electric circuitry may comprise conducting wires, which can be embedded in the foil. The wires can comprise a metal or a transparent conductor, e.g. a transparent conductive oxide such as indium tin oxide (ITO) or indium zinc oxide (IZO), or a transparent conductive polymer. For example, each of the at least one sensor may be connected to at least one wire. The at least one wire may be connected to the interface controller or to a plug/socket interface. A plug/socket interface may be arranged for example at an edge of the foil, particularly at an edge of the foil, wherein the edge is not visible from an inside of the elevator car. In particular, the plug/socket interface may be arranged in a roof section of the elevator car.

According to some embodiments, the interface comprises at least one sensor for each user request, particularly one sensor for each user request. In particular, the interface may comprise at least two sensors, more particularly at least three sensors or at least four sensors, or maximum 70 sensors, particularly maximum 50 sensors or maximum 30 sensors. Each sensor of the at least one sensor can be connected to at least one wire. In embodiments with more than one sensor, a group of sensors of the at least one sensor may be arranged linearly, as an array or as a matrix.

In some embodiments, the at least one sensor comprises a high density sensor array configured as a touch area. The touch area may comprise a plurality of touch regions. The plurality of touch regions can comprise at least two request regions, wherein each of the at least two request regions is associated with a user request. The interface controller may be configured for determining to which region of the plurality of touch regions a pressure was applied by touching the foil. If the region is within one of the at least two request regions, the interface controller receives the associated user request.

According to some embodiments the at least one sensor has a thickness of maximum 1 mm, particularly of maximum 0.7 mm or maximum 0.5 mm. In some embodiments, the at least one sensor comprises a microelectromechanical system (MEMS). In particular, the at least one sensor may comprise components between 1 µm and 100 µm in size.

According to embodiments, the at least one sensor comprises a cavity and a membrane, wherein the at least one sensor is configured for sensing of a pressure applied to the at least one sensor based on a bending of the membrane into the cavity. In particular, a sensor of the at least one sensor may comprise a base layer, wherein the cavity is arranged on a base layer surface. The membrane may at least partially span the base layer surface such that the membrane is suspended over the cavity. By applying a pressure to the sensor, the membrane can be bent into the cavity. In embodiments, the membrane is arranged between the base layer and a protective layer of the foil. In further embodiments, the membrane can be arranged between the base layer and the wall surface.

In some embodiments, the sensor can be configured to provide a change of a capacitance of the sensor upon bending the membrane into the cavity. In particular, the membrane and the base layer may be configured to form a capacitor. For example, the base layer may comprise a base electrode layer. The membrane may comprise a membrane electrode layer. The base electrode layer and the membrane electrode layer may be connected to the interface controller. In particular, the interface controller may be configured to detect a change of the capacitance between the base electrode layer and the membrane electrode layer. A change of the capacitance can for example result from a decrease in distance between the base electrode layer and the membrane electrode layer, if the membrane is bent into the cavity. According to embodiments, the base layer comprises a base insulating layer between the base electrode layer and the membrane. In particular, the cavity can be formed in the base insulating layer. The membrane electrode layer can be provided on a supporting membrane layer. The supporting membrane layer may comprise a polymer, in particular a transparent polymer. The membrane electrode layer may be provided on a base side of the membrane, the base side facing the base layer of the sensor.

According to embodiments, the membrane electrode layer may comprise graphene, particularly globular graphene, e.g. graphene in the form of micro-spheres or "micro-bubbles". Using globular graphene in the membrane electrode layer may advantageously provide a high conductance of the membrane electrode layer or may provide for a detection of a change of the capacitance based on a deformation of the globular graphene, if the membrane is bent into the cavity. According to embodiments, the base electrode layer may comprise a transparent conductive film, e.g. a film of a transparent conducting oxide such as ITO or IZO, a film of a transparent conductive polymer or a film of graphene. The base insulating layer may comprise an insulating material, particularly a transparent insulating material such a transparent polymer or glass. In embodiments, at least one of the at least one sensor, the membrane and the base layer can be transparent.

In some embodiments, each sensor of the at least one sensor comprises at least two cavities, particularly at least four cavities or a plurality of cavities, wherein the membrane spans the cavities. A sensor having more than one cavity may have a higher stability or provide a stronger signal, particularly without increasing a thickness of the sensor.

According to some embodiments, the interface controller is configured to provide a haptic feedback upon receiving a user request by injecting a charge into the at least one sensor. In particular, the at least one sensor can be configured to be expandable. For example, a sensor according to embodiments described herein may have a membrane suspended over a cavity of a base layer, wherein the membrane and the cavity form a capacitor. Injecting a charge into the capacitor may repel at least a suspended part of the membrane from the base layer. The membrane may expand the sensor such that the foil expands towards an inside of the elevator car to provide a haptic feedback. The interface controller may be configured to provide the haptic feedback within a time period of maximum 2 seconds, particularly maximum 1 second or maximum 0.5 seconds, upon receiving a user request. The haptic feedback can be particularly provided by the same at least one sensor which received the user request.

According to embodiments, the interface comprises a projector configured for installation in a roof section of the elevator car, the projector being configured for projecting information onto a projection surface of the elevator car. The projector may project information for a user of the elevator car, e.g. information concerning the operation of the car, for example a current floor number, a destination floor number or maintenance information. The projector can be configured to project the information on a projection surface in the upper 50% of the height of a cabin of the car, particularly in the upper 30% or the upper 20% of the cabin, wherein the cabin of the car is particularly the interior space of the elevator car. In some embodiments, the projection surface can be on the same wall as the wall surface to which the foil is attached. In particular, the projection surface can be arranged vertically above the at least one sensor or the projection surface can at least partially overlap with the wall surface. In further embodiments, the projection surface can be on a further wall different from the wall to which the foil is attached. The projector may provide white-light or colored projection beaming.

In embodiments, the projector is arranged in a roof section of the elevator car. In particular, the roof section can comprise at least one of a decorative roof, a car roof and a space between the decorative roof and the car roof. The decorative roof can form a roof to the cabin in the elevator car. In particular, a bottom side of the decorative roof is visible from the inside of the cabin. The car roof can form a roof of the elevator car. In some embodiments, the car roof and the decorative roof can be formed as a single roof. Providing a projector according to embodiments described herein can provide the advantage that information can be displayed, particularly without mounting a display into a wall of the elevator car. For example, an elevator car can be provided with a wall which does not have holes or deep recesses for mounting a car operating panel and a display.

According to embodiments, the interface controller is configured for connection to a car controller of the elevator car. The car controller can be arranged in a roof section of the elevator car. The car controller can be connected to an elevator controller of an elevator system, wherein the elevator system comprises the elevator car. The interface controller can be configured for arrangement outside an interior space of the elevator car, particularly outside a cabin of the elevator car. More particularly, the interface controller can be configured for arrangement in a roof section of the elevator car. In some embodiments the interface controller is formed as an individual controller. In further embodiments, the interface controller and the car controller can be arranged together in a controller structure.

According to embodiments, the interface may comprise at least one of a loudspeaker and a microphone. The loudspeaker or the microphone can be configured for installation in a roof section of the car. The loudspeaker and the microphone may particularly allow for an emergency call. Installing at least one of the loudspeaker and the microphone in a roof section may advantageously dispense with installing the loudspeaker or the microphone in a wall of the elevator car.

According to embodiments of the disclosure, an elevator car comprises an interface as described herein. The interface is attached to a wall surface of a wall of the elevator car, wherein the wall surface faces the inside of the elevator car. In some embodiments, the wall of the car can comprise for example glass, stainless steel or zinc sheet. In embodiments, an inner side of the wall may be decorated, wherein the inner side faces the inside of the elevator car.

According to some embodiments, the foil is attached to the wall surface by an adhesive layer. For example, an adhesive layer can comprise a synthetic resin, e.g. epoxy glue, or a silicone adhesive. In embodiments, the adhesive layer can be at least substantially transparent.

According to embodiments, the wall has a recess, wherein the recess comprises the wall surface and wherein the foil is arranged at least partially within the recess. In particular, the recess can have a depth which at least essentially corresponds to a thickness of the foil. For example, the depth of the recess may deviate from the thickness of the foil by maximum 30% of the thickness of the foil, particularly maximum 20% or maximum 10%. In embodiments, the recess may have a depth of maximum 7 mm, particularly of maximum 6 mm or maximum 5 mm.

In some embodiments, the foil is at least substantially flush with a further wall surface of the wall, the further wall surface being outside the recess. In particular, an inner surface of the foil, the inner surface facing the inside of the elevator car, can be flush with the further wall surface. The further wall surface can be a surface of the wall directly adjacent to the recess in the wall. "At least substantially flush" can be understood for example such that a deviation between an edge of the foil and the further wall surface does not exceed 3 mm, particularly 2 mm or 1 mm. Providing a foil that is at least substantially flush with a further wall surface can provide the advantage that the foil can be seamlessly integrated with the wall.

According to embodiments of the disclosure, a method of producing an elevator car comprising an interface, in particular an interface according to embodiments described herein, is provided. In embodiments, the method comprises attaching a foil of the interface to a wall surface of a wall of the elevator car. The foil may be attached to the wall surface by applying an adhesive, e.g. an adhesive layer, on the foil or on the wall surface. In some embodiments, attaching the foil comprises the application of at least one of temperature and heat.

According to embodiments, the method comprises installing at least one of a projector, a loudspeaker and a microphone in a roof section of the elevator car. In some embodiments, the method may comprise installing an interface controller in a roof section of the elevator car. In embodiments, the method can comprise connecting at least one of the foil, the projector, the loudspeaker and the microphone to the interface controller.

The interface according to embodiments described herein may provide various advantages over known car operating panels. For example, the interface may be integrated seamlessly with a wall of the elevator car. The interface may reduce a thickness of a wall or the space reserved for electrical components behind a wall. Without holes or deep recesses in the wall of the elevator car, the structural integrity of the wall may be improved. Further, an assembly of an elevator car may be simplified. Also, servicing of the interface may be simplified. For instance, the interface may be easily and thoroughly cleaned, particularly without a danger of damaging electrical components of the interface, e.g. by an exposure to liquids. Furthermore, the interface may be compatible with curved wall surfaces. The interface may allow for an advantageous integration with decorated walls or transparent walls.

In the following, exemplary embodiments of the disclosure will be described with reference to the drawings.

The figures are only schematic and not to scale. Same reference signs refer to same or similar features.

DETAILED DESCRIPTION

Figure 1:
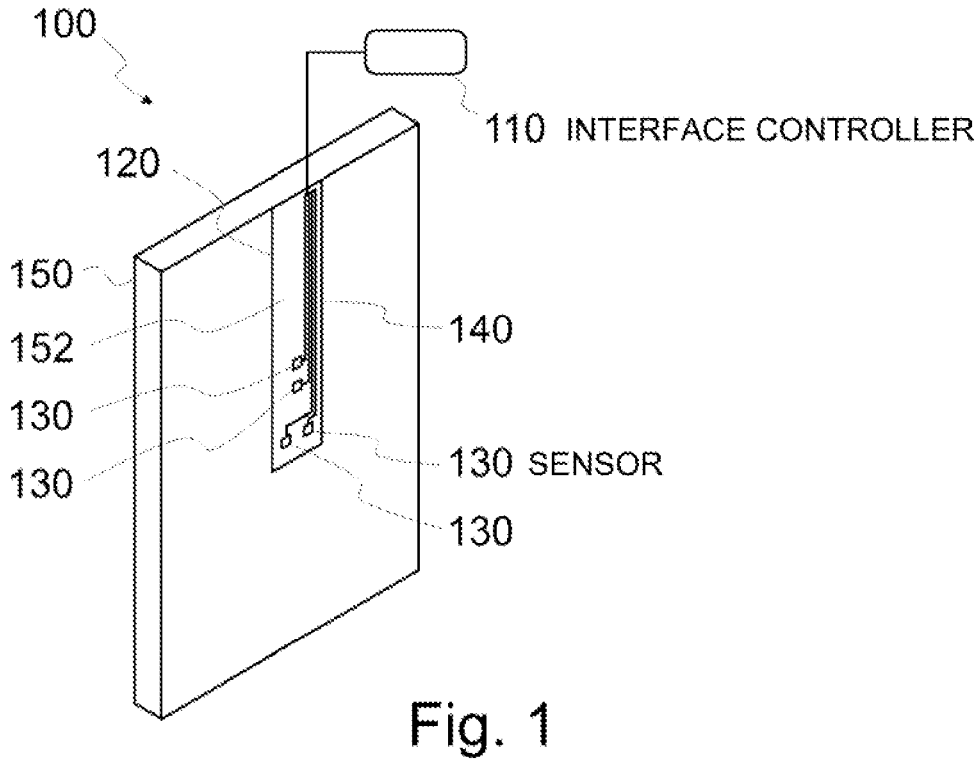
FIG. 1 shows a schematic view of an interface with a foil attached to a wall according to the invention.

FIG. 1 shows a schematic view of an interface 100. The interface 100 comprises a foil 120. The foil 120 is attached to a wall surface 152 of a wall 150 of an elevator car. The wall surface 152 reaches to a top side of the wall 150, in particular to a roof section of the elevator car. The interface 100 comprises at least one sensor, in FIG. 1 exemplarily illustrated as sensors 130. The sensors 130 are connected via an electric circuitry 140 of the interface 100 to an interface controller 110 of the interface 100. The interface controller 110 is configured for installation in a roof section of the elevator car. The electric circuitry 140 is partially embedded in the foil 120 and exits the foil at a top edge of the foil 120. In FIG. 1, each of the sensors 130 is associated with a user request. Each sensor 130 is configured for receiving a user request by an application of a pressure to the sensor 130. The sensors 130 are connected to the interface controller 110, which is configured to detect an application of a pressure to a sensor 130 and to determine the respective user request. The interface controller 110 is configured for transmitting the user request to a car controller of the elevator car.

Figure 2:
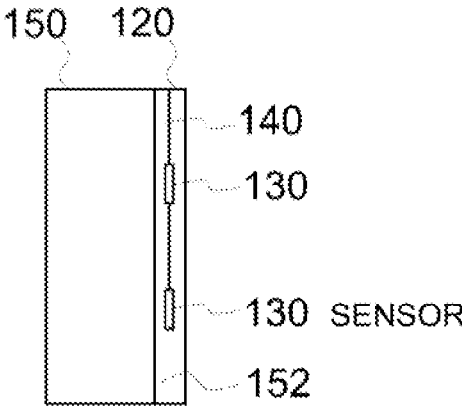
FIG. 2 shows a schematic sectional view of an interface according to an embodiment.

FIG. 2 shows a schematic sectional view of a foil 120 of an interface, as illustrated for example in FIG. 1. The foil 120 is attached to the wall surface 152 using an adhesive, for example using epoxy. The sensors 130 are embedded in the foil 120. Each sensor 130 is connected to at least one wire of the electric circuitry 140, the wires being embedded in the foil 120. In FIG. 2, the wires comprise a transparent conductor.

Figure 3:
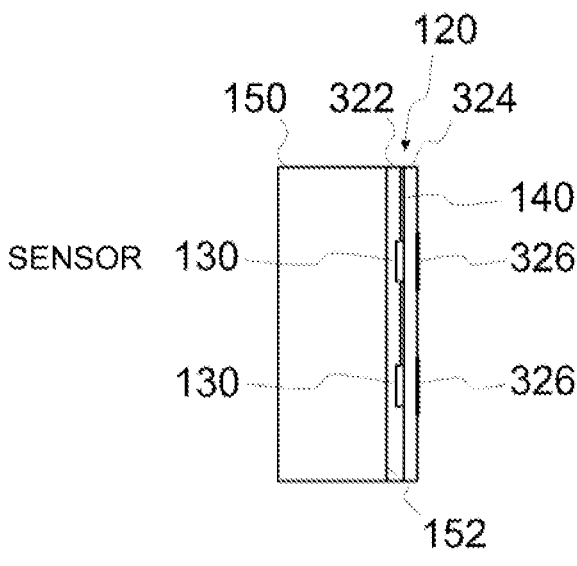
FIG. 3 shows a schematic sectional view of an interface according to a further embodiment.

In the exemplary embodiment of FIG. 3, a foil 120 of an interface 100 comprises a protective layer 324 and an embedding layer 322. The protective layer 324 is arranged on an inner side of the foil 120, wherein the inner side faces an inside of the elevator car. The embedding layer 322 is arranged between the protective layer 324 and the wall surface 152 of the wall 150. The sensors 130 and the electric circuitry 140 are embedded in the foil 120, in particular in the embedding layer 322 of the foil 120. In FIG. 3, the sensors are arranged in contact with the protective layer 324. In the exemplary embodiment, the embedding layer 322 is formed prior to attachment of the foil 120 to the wall surface 152 by molding of a polymer around the sensors 130 and the electric circuitry 140, the sensors 130 and the electric circuitry 140 being pre-arranged on the protective layer 324.

In FIG. 3, the protective layer 324 comprises signs 326 indicative of user requests. In particular, a sign 326 indicative of a first user request is co-localized with a sensor 130 associated with the first user request. In FIG. 3, the signs 326 are printed onto the protective layer 324.

Figure 4A:
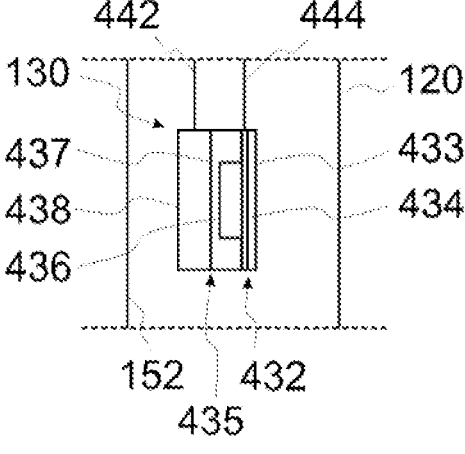
FIG. 4A shows a schematic sectional view of a sensor of an interface.
Figure 4B:
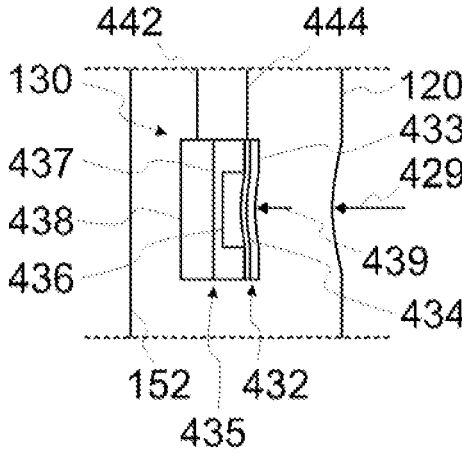
FIG. 4B shows a schematic sectional view of a sensor during an application of a pressure to the sensor.

FIGS. 4A and 4B show a schematic sectional view of an interface 100 with an exemplary pressure-sensitive sensor 130. The sensor 130 is embedded in the foil 120, which is attached to the wall surface 152. The sensor 130 comprises a cavity 436 and a membrane 432. The membrane 432 is suspended over the cavity 436. The sensor 130 is configured for sensing of a pressure 439 applied to the at least one sensor 130 based on a bending of the membrane 432 into the cavity 436, as shown for example in FIG. 4B. The pressure 439 may particularly result from a force 429 or touch applied to the foil 120 from an inside of the elevator car. The force 429 may be applied by a user using a hand or a finger, when providing a user request to the interface 100.

In the exemplary embodiment of FIGS. 4A and 4B, the cavity 436 is provided in a base layer 435 of the sensor 130, in particular in a base insulating layer 437 of the base layer 435. The base layer 435 comprises the base insulating layer 437 and a base electrode layer 438, wherein the base insulating layer 437 is provided between the base electrode layer 438 and the membrane 432 of the sensor 130. The base layer 435 comprises rigid material, in particular transparent rigid material. For example, the base electrode layer 438 comprises a transparent conductive oxide and the base insulating layer 437 comprises a transparent insulating material, e.g. a transparent oxide such as glass. The sensors 130 may be fabricated in a size such that a rigidity of the base layer 435 does not prevent an overall flexibility of the foil 120. In further embodiments, a base layer may be fabricated from flexible material, particularly from material less flexible than the membrane.

The membrane 432 comprises a supporting membrane layer 433 and a membrane electrode layer 434. The membrane electrode layer 434 is arranged between the supporting membrane layer 433 and the base layer 435. In the exemplary embodiment of FIGS. 3, 4A and 4B, the supporting membrane layer 433 comprises a polymer. The membrane electrode layer 434 comprises globular graphene. The membrane electrode layer 434 and the base electrode layer 438 form a capacitor. Upon application of a pressure 439 to the sensor 130, the membrane 432 is bent into the cavity 436 and a capacitance of the capacitor is changed. The change of the capacitance can provide a change of a current or a change of a voltage on at least one of a base connection 442 and a membrane connection 444, wherein the base connection 442 is connected to the base electrode layer 438 and wherein the membrane connection 444 is connected to the membrane electrode layer 434. The connections 442 and 444 are connected to or are part of the electric circuitry 140. Based on the change in current or voltage, the interface controller 110 can detect the application of the pressure 439. Based on the detection of the pressure 439, the interface 100 can receive the user request.

Figure 5:
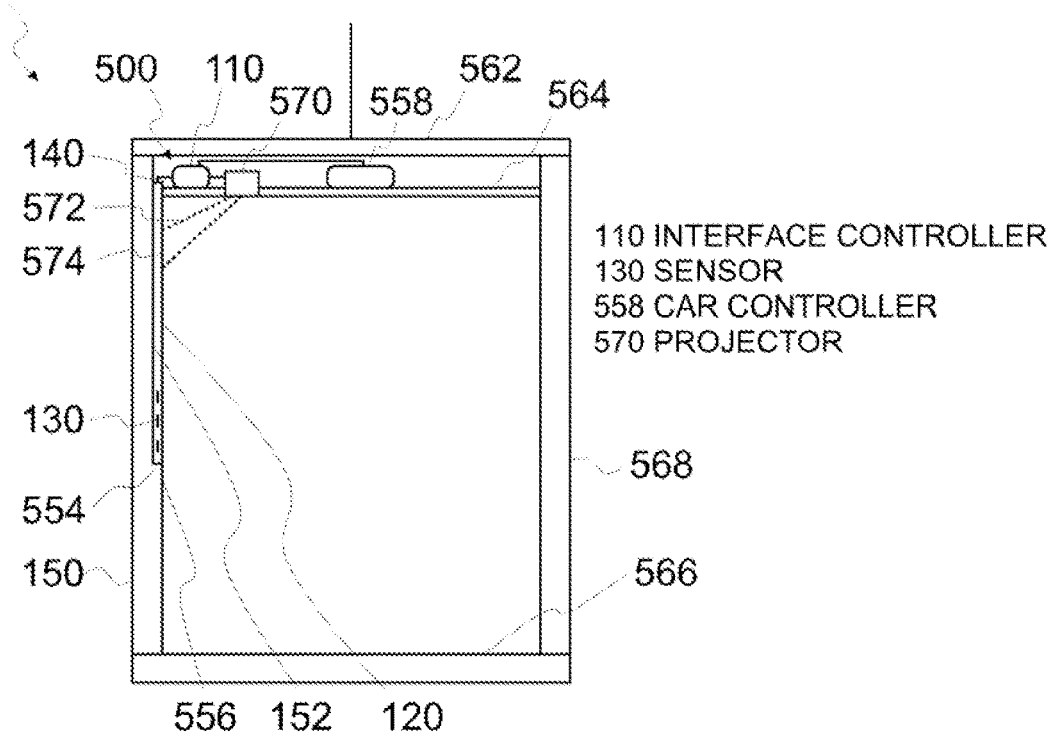
FIG. 5 shows a schematic view of an elevator car according to an embodiment.

FIG. 5 shows a schematic view of an elevator car 560. The elevator car 560 comprises a wall 150 and a further wall 568. The wall 150 and the further wall 568 are arranged between an elevator floor section of the elevator car 560, which includes a floor 566 of the elevator car 560, and a roof section of the elevator car 560. The roof section particularly includes a decorative roof 564, a car roof 562 and a space between the decorative roof 564 and the car roof 562.

The elevator car 560 of FIG. 5 comprises an interface 500. A foil 120 of the interface 500 is attached to a wall surface 152, wherein the wall surface 152 is arranged in a recess 554 of the wall 150. In particular, the foil 120 is flush with a further wall surface 556 of the wall 150, the further wall surface 556 being directly adjacent to the recess 554. In FIG. 5, the foil 120 extends or reaches up to the roof section of the elevator car 560. The electric circuitry 140 exits the foil 120 in the roof section and connects the sensors 130 to the interface controller 110. The interface controller 110 is connected to a car controller 558 of the elevator car 560. For example, the car controller 558 is connected to an elevator controller of an elevator system (not shown), in which the elevator car 560 is arranged.

In FIG. 5, the interface 500 comprises a projector 570. The projector 570 is arranged in the roof section of the elevator car 560. The projector 570 is configured for projecting information, e.g. a current floor number, via a projector beam 572 onto a projection surface 574 of the elevator car 560. In FIG. 5, the projection surface 574 is arranged on the wall 150, particularly above the sensors 130 and overlaps with the wall surface 152. An embodiment as shown exemplarily in FIG. 5 may particularly provide the advantage that an interface 500 having sensors 130 for user input and a projector 570 for displaying information can be seamlessly integrated into an elevator car 560.

Figure 6:
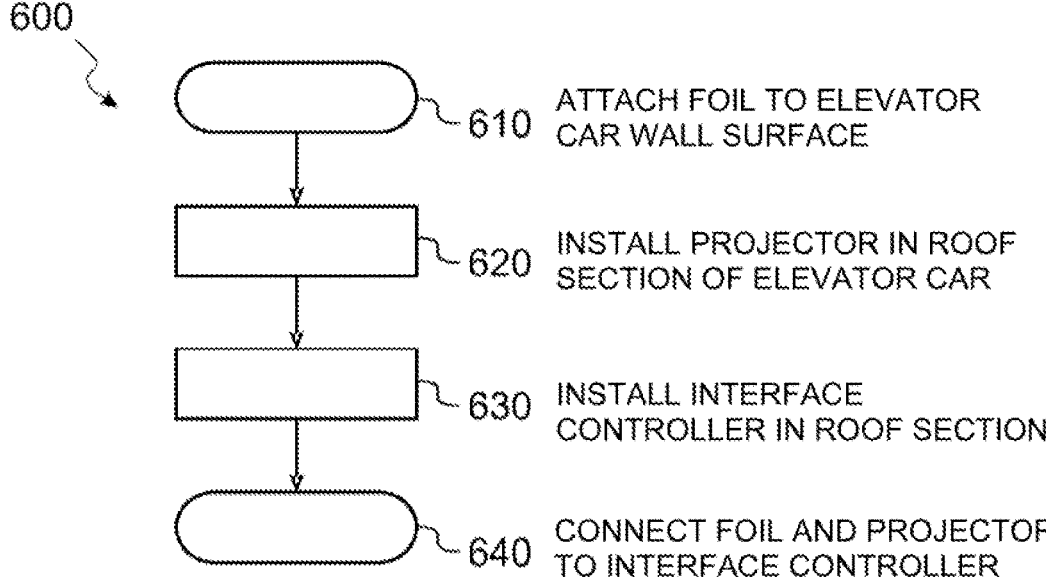
FIG. 6 shows a schematic illustration of a method according to an exemplary embodiment.

FIG. 6 schematically illustrates an exemplary method 600 of producing an elevator car, particularly comprising an interface according to embodiments described herein. At a step 610, the method 600 comprises attaching a foil of the interface to a wall surface of a wall of the elevator car. Attaching the foil to the wall surface comprises applying an adhesive layer to at least one of the wall surface or to the foil. At a step 620, the method 600 includes installing a projector in a roof section of the elevator car such that the projector can project information onto a projection surface. At a step 630, an interface controller is installed in the roof section. At a step 640, the foil and the projector are connected to the interface controller. The interface controller is connected to a car controller of the elevator car.

Even though the invention of the present disclosure has been described with reference to exemplary embodiments, it should be noted that embodiments may be combined and modified in various ways without departing from the scope of the present invention.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An interface for operating an elevator car comprising:
an interface controller;
a foil attached to a wall surface of a wall of the elevator car;
at least one pressure-sensitive sensor adapted to receive user requests by an application of a pressure to the at least one sensor;
wherein the foil includes a protective layer arranged between the at least one sensor and an inside of the elevator car;
wherein the at least one sensor is connected to the interface controller, the interface controller being adapted for connection to a car controller of the elevator car and for transmitting the user requests received by the at least one sensor to the car controller of the elevator car; and
wherein the at least one sensor is embedded in the foil in an embedding layer of the foil, the embedding layer being arranged between the protective layer and the wall surface.

2. The interface according to claim 1 wherein the protective layer includes at least one sign indicative of one of the user requests.

3. The interface according to claim 1 wherein at least one of the foil, the embedding layer and the protective layer is flexible.

4. The interface according to claim 1 wherein at least one of the foil, the embedding layer and the protective layer is transparent or at least substantially transparent.

5. The interface according to claim 1 wherein at least one of the embedding layer and the protective layer is formed of a polymer material.

6. The interface according to claim 1 including electric circuitry connecting the at least one sensor with the interface controller, wherein the electric circuitry is at least partially embedded in the embedding layer of the foil.

7. The interface according to claim 1 wherein the at least one sensor includes a cavity formed therein and a membrane, and wherein the at least one sensor is adapted to sense of the pressure applied to the at least one sensor based on a bending of the membrane into the cavity.

8. The interface according to claim 1 wherein the foil has a maximum thickness in a range of 3 mm to 5 mm.

9. The interface according to claim 1 wherein the interface controller provides a haptic feedback upon receiving one of the user requests by injecting a charge into the at least one sensor.

10. The interface according to claim 1 wherein the interface further comprises a projector configured for installation in a roof section of the elevator car, wherein the projector is configured to project information onto a projection surface of the elevator car.

11. An elevator car comprising:
the interface according to claim 1 installed in the elevator car;
a wall having a wall surface facing an inside of the elevator car; and
wherein the foil of the interface is attached to the wall surface.

12. The elevator car according to claim 11 wherein the wall has a recess formed therein, the recess including the wall surface, and wherein the foil is arranged at least partially within the recess.

13. The elevator car according to claim 12 wherein the foil is flush or substantially flush with a further wall surface of the wall, the further wall surface being outside the recess.

14. A method of producing an elevator car, the method comprising the steps of:
providing the interface according to claim 1; and
attaching the foil of the interface to an interior wall surface of a wall of the elevator car wherein the at least one sensor is available for receiving user requests by an application of pressure to the at least one sensor from a user inside the elevator car;
wherein the foil of the interface is attached within a recess of the interior wall surface of the wall of the elevator car such that the foil is substantially flush with a further wall surface.

* * * * *